US010435317B2

(12) United States Patent
Liu et al.

(10) Patent No.: US 10,435,317 B2
(45) Date of Patent: Oct. 8, 2019

(54) COMPOSITE MATERIAL FOR CATALYTIC TREATMENT OF CONTAMINATED SOIL AND WATER AND CATALYTIC TREATMENT METHOD THEREOF

(71) Applicant: Jilin University, Changchun (CN)

(72) Inventors: Na Liu, Changchun (CN); Longzhen Ding, Changchun (CN); Pengpeng Zhang, Changchun (CN)

(73) Assignee: Jilin University, Changchun (CN)

( * ) Notice: Subject to any disclaimer, the term of this patent is extended or adjusted under 35 U.S.C. 154(b) by 246 days.

(21) Appl. No.: 15/447,038

(22) Filed: Mar. 1, 2017

(65) Prior Publication Data

US 2018/0179090 A1 Jun. 28, 2018

(30) Foreign Application Priority Data

Dec. 23, 2016 (CN) .......................... 2016 1 1207151

(51) Int. Cl.
*B01J 27/24* (2006.01)
*B01J 37/08* (2006.01)
(Continued)

(52) U.S. Cl.
CPC ................. *C02F 1/70* (2013.01); *B01J 27/24* (2013.01); *B01J 37/084* (2013.01); *B09C 1/002* (2013.01); *B09C 1/08* (2013.01); *C02F 1/68* (2013.01); *B09C 2101/00* (2013.01); *C02F 2101/20* (2013.01); *C02F 2101/345* (2013.01); *C02F 2101/36* (2013.01); *C02F 2101/38* (2013.01);
(Continued)

(58) Field of Classification Search
CPC . B01J 21/18; B01J 27/24; B01J 35/026; B01J 37/04; B01J 37/06; B01J 37/084; B09C 1/08; B09C 2101/00; B09C 1/002; C02F 1/68; C02F 1/70; C02F 2101/20; C02F 2101/345; C02F 2101/36; C02F 2101/38; C02F 2103/007; C02F 2103/06
See application file for complete search history.

(56) References Cited

U.S. PATENT DOCUMENTS

| 2004/0157317 A1* | 8/2004 | Sorenson, Jr. ............ B09C 1/10 435/262.5 |
| 2010/0158612 A1* | 6/2010 | Chiu ........................ B09C 1/08 405/128.5 |

* cited by examiner

*Primary Examiner* — Lucas A Stelling
(74) *Attorney, Agent, or Firm* — Wayne & Ken, LLC; Tony Hom

(57) ABSTRACT

Metal-free materials, manufacturing thereof, method using thereof for (in-situ or ex-situ) catalytically treating contaminated soil or waters, including remediation of groundwater contaminated by haloalkenes, haloalkanes, nitro-compounds, and nitrophenol using sulfide as a reductant. Metal-free materials are manufactured with industrial scrap syrup or biomass. Method using the metal-free materials for in-situ treatment consists with the processes of adding materials into the contaminated medium, introducing sulfide into the contaminated medium, and reductive reacting contaminants with sulfide catalyzed by the metal-free materials. Specially, the formation of in-situ reaction zone is the key point of in situ treatment by retaining the catalyst in the contaminated medium. Method using the metal-free materials for ex-situ treatment consists steps of adding materials and sulfide into the contaminated fluid, intermingling the contaminated fluid with materials in a vessel, reacting contaminants with sulfide catalyzed by the metal-free material.

8 Claims, 5 Drawing Sheets

(51) Int. Cl.
B09C 1/08 (2006.01)
C02F 1/68 (2006.01)
C02F 1/70 (2006.01)
B09C 1/00 (2006.01)
*C02F 101/36* (2006.01)
*C02F 101/38* (2006.01)
*C02F 101/34* (2006.01)
*C02F 101/20* (2006.01)
*C02F 103/06* (2006.01)
*C02F 103/00* (2006.01)

(52) U.S. Cl.
CPC .... *C02F 2103/007* (2013.01); *C02F 2103/06* (2013.01)

COMPOSITE MATERIAL FOR CATALYTIC TREATMENT OF CONTAMINATED SOIL AND WATER AND CATALYTIC TREATMENT METHOD THEREOF

FIELD OF THE INVENTION

The present invention relates generally to the field of waters or soil decontamination. More specially, the invention relates to composite materials and methods for catalytic treatment of contaminated soil and waters, including treatment of groundwater contaminated by haloalkenes, haloalkanes, nitro-compounds, nitrophenol and/or heavy metals.

BACKGROUND OF THE INVENTION

The widely usage of halogen and nitroaromatic solvents, including perchloroethylene (PCE), trichloroethylene (TCE), and nitrobenzene, has led to the continued release of such toxic organic compounds into the environment during industrialization. As persistent pollutant, those contaminants are quite stable under natural conditions, and easily accumulated in aquatic environment for years, thus causing incredible effects on human beings and the aquatic ecological environment.

Over the years, many methods have been developed for degrading those contaminants in soil and water, some relating to in situ treatment and others that relate to ex situ treatment. For instance, anaerobic biodegradation, advanced oxidation, thermal desorption, activated carbon adsorption, zero-valent iron reduction reaction, and metal catalyst reduction reaction with hydrogen as reductant using Fe, Ni, Pt, Pd, Rh, etc. However, the above treatment methods have some drawbacks.

For the anaerobic biodegradation of reductive dechlorination, dissolved oxygen inhibits or even kills the dechlorinated bacteria, thus, a strict anaerobic environment is required. Also, cobalamin is a necessary nutritional factor required. Moreover, the types of electron donor, pH, or temperature etc. also affect the biodegradation efficiency. The long processing time is another drawback for biodegradation.

For advanced oxidation and thermal desorption, the high cost would be the main limiting factor. As is to activated carbon adsorption, in fact, the method cannot completely degrade the contaminants, but only transfer the contaminants from aqueous phase to solid phase. However, hydroxide or carbonate precipitation forms in the surface of zero-valent iron in the process of reducing dechlorination, thereby reducing its reductive dechlorination effect.

For metal catalyst reduction reaction, in order to achieve efficient decontamination, suitable pH condition, high operating temperature is usually required. The cost for operation is expensive, let alone the high price of catalyst. When used in situ treatment, the metal catalysts would be poisoned by the $SO_3^{2-}$ and $HS^-$ in groundwater, disabling the activity of the metal catalysts. Moreover, metal catalysts are expensive and are also easy to cause secondary contamination, thereby limiting its application.

So currently, it is still very significant to develop more economical and effective method to treat contaminated groundwater or soil.

SUMMARY OF THE INVENTION

In order to overcome the deficiencies above, the present invention provides a method for preparation of several metal-free materials which can be used as catalysts for the (in-situ or ex-situ) decontamination treatment of contaminated waters or soil, including remediation of groundwater contaminated by haloalkenes, haloalkanes, nitro-compounds, nitrophenol using sulfide as reductant. More specially, the synthetic materials can be classified into two types. One is made from industrial scrap syrup. The other is made from biomass. The primary containing elements of the two metal-free catalysts are nitrogen and carbon.

The present invention also provides a method for in-situ catalytic decontamination of contaminated groundwater or soil using the metal-free materials. Generally, the method includes the processes of adding materials into the contaminated medium, introducing sulfide into the contaminated medium, reductive reacting contaminants with sulfide catalyzed by prepared material. Specially, forming in-situ reaction zone is the key point of the present invention by retaining the catalyst in the contaminated medium.

The present invention also provides a method for ex-situ catalytic decontamination of contaminated groundwater using self-prepared materials. The method includes the steps of adding materials and sulfide into the contaminated fluid, intermingling the contaminated fluid with materials in a vessel, reacting contaminants with sulfide catalyzed by prepared material. Specially, in order to achieve good solid-liquid separation, the size of materials should be controlled in micron level.

BRIEF DESCRIPTION OF THE DRAWINGS

The present invention may be more clearly understood in conjunction with the following drawings.

DETAILED DESCRIPTION OF THE INVENTION

Figure 1:
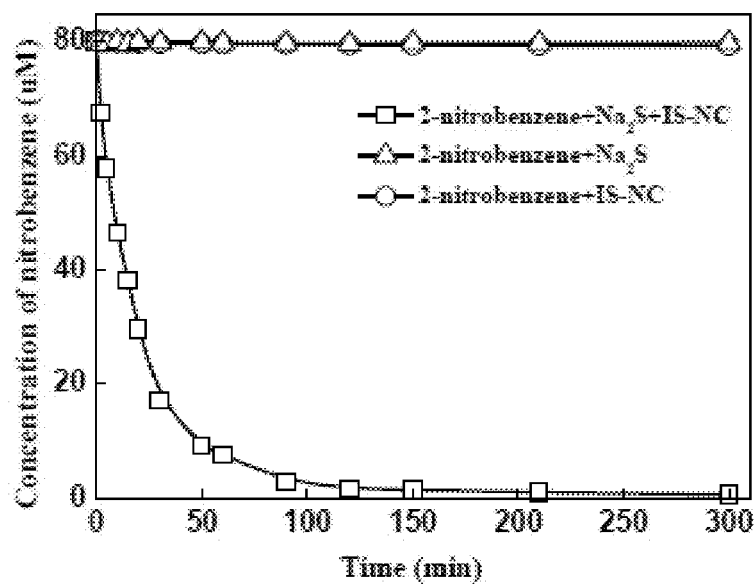
FIG. 1 is a graph proving that IS-NC can catalyze the redox reaction of nitrobenzene using sulfide as a reductant.

The present invention directs to the application of two types of new metal-free catalyst and suitable reducing agent for the detoxification of several pollutants from various effluents or contaminated soil. More specially, the pollutants include haloalkenes, haloalkanes, nitro-compounds, nitrophenol and heavy metals.

The two metal-free catalyst are the highlights in the present invention and play the most important role in the detoxification. One of the new metal-free catalyst is coded as IS-NC, because the industrial scrap syrup (IS) is the main raw material and the main elements in the IS-NC are nitrogen and carbon. Another metal-free catalyst is coded as Bio-NC, because its main raw material is biochar and its main elements are nitrogen and carbon too. In respect to the raw materials used in the present invention, in somewhat, it embodies the theory of "using waste to treat waste".

Specifically, the IS-NC can be prepared as following steps: (1) Successively adding $Al(NO_3)_3 \cdot 9H_2O$, citric acid, IS, $H_3PO_4$ (85 wt. %) into distilled water in a 500 mL three-necked bottle at room temperature. Ammonia solution (10%) was then dropped to adjust the pH value of the mixture to about 5.0. As a detail implement scheme, the said usage of $Al(NO_3)_3 \cdot 9H_2O$, citric acid, IS, $H_3PO_4$ and distilled water could be 21.2%, 5.9%, 11.3%, 4.8% and 56.8% respectively. Depending on actual requirement, the usage can be of course enlarged or reduced in proportion. (2) After removing water by heating the system at 80-90° C., the resultant black solid composite was pretreated at 300° C. in muffle furnace for a few minutes and then carbonized at 800° C. in tube furnace with nitrogen flow for 6 h. (3) The carbonized sample was recovered after treating with 4 mol/L $HNO_3$ solution for 6 h at 60° C., washed with deionized water, and dried at 110° C. (4) At last, the acquired sample was treated at 800° C. in nitrogen flow for 6 h and the IS-NC will be successfully prepared. What's more, in the present invention, glucose, sucrose and may be other saccharides can be the substitute of IS in said synthetic method.

As is concerned to Bio-NC, the raw materials could be straws, vines, some plants and/or some branches and trunk. For example, corn stalk, sorghum stalk, alfalfa, wormwood, soybean hull, and branches of *catalpa* tung etc. can all be employed as raw materials. Among those, the Bio-NC made by alfalfa and wormwood are preferable. The specific methods according to Bio-NC include the steps of: (1) dry the raw materials in the air or dry them in low temperature using oven. (2) the dehydrated raw materials would be carbonized at 800° C. in tube furnace with nitrogen flow for 6 h. (3) The carbonized sample was recovered after treating with 4 mol/L $HNO_3$ solution for 6 h at 70° C., washed with deionized water, and dried at 110° C. (4) At last, the acquired sample is treated at 800° C. in nitrogen flow for 6 h and the Bio-NC will be successfully prepared. To make sure the high catalytic effect of IS-NC and Bio-NC, before treating with 4 mol/L $HNO_3$, the materials would better be grinded in advance.

With respect to the type of suitable reducing agents in the present invention, it mainly refers to compounds containing sulfur. For example: sodium sulfide, potassium sulfide, calcium sulfide, sodium sulfite, sodium hyposulfate can be all employed in the present invention. Sodium sulfide is preferable.

In an embodiment of the present invention, the metal-free catalyst can be applied ex situ, for treatment of such media as groundwater, waste water from an industrial plant, as well as, water from a lake, river, stream, etc.

According to this aspect, the process of ex situ treatment method includes the steps of adding materials and sulfide into the contaminated fluid, intermingling the contaminated fluid with materials in a vessel, reacting contaminants with sulfide catalyzed by prepared material.

As is concerned to the water treatment device for the ex situ treatment, any water treatment device commonly applied in the art could be employed. Necessarily, the water treatment device needs to be enclosed to keep the reductants away from oxygen. And the device equipped with stirrer would be better. It should be noted that one skilled in the art would know how to use the catalysts offered in the present invention in some water treatment devices. Herein, just for example, the column device and the skid mounted device are recommended to be used for the ex situ treatment.

If a column is employed in the ex situ treatment, aforementioned metal-free catalyst of the present invention would be processed into particles with suitable size using disc refiner or ball milling techniques. Depending on its use, the metal-free catalyst particles will be mixed with rivers and fine sand, medium sand, coarse sand, or with commercially available packing materials such as silica and the like. The column would then be packed using techniques that well known and descried in the art. Depending on its application, the acceptable hydraulic retention time (HRT) may be very different from each other, as well as the column may also vary in volume. Generally, the lager acceptable HRT is, the longer and lager columns will be. Typically, the column has a length from about 1 m to about 10 m and a diameter from 0.4 m to 1 m in the present invention. It is important to note that before pumping into column, the contaminated fluid should be premixed with definite concentration sodium sulfide at first.

If a skid mounted device is used in the present invention, the contaminated underground water will be pumped into a tank that has metal-free catalyst particles percolating therein. The contaminated groundwater remains in the tank for a period of time sufficient to decontaminated the polluted fluid. In fact, the pollutant will be restored by sulfide with the catalysis of metal-free materials. And if the contaminated groundwater could be pre-heated, the time polluted water in the tank would be relatively short.

In another embodiment of the present invention, the metal-free catalyst can be also used in situ, for treatment of soil and groundwater. Generally, the method for in situ decontaminating includes the processes of adding materials into the contaminated medium, introducing sulfide into the contaminated medium, reductive reacting contaminants with sulfide catalyzed by prepared material. Specially, forming in situ reaction zone is the key point of the present invention by retaining the catalyst in the contaminated medium. It should be noted that, the sulfide can be added together with the metal-free catalyst too, and it is preferable sometimes.

In the case of in situ process for treating a contaminated medium, the catalyst particles would be dispersed in aqueous solution with definite concentration of sulfide in. Subsequently, the mixture needs to be injected into permeable zones of an aquifer to be treated using techniques well known to one skilled in the art. Once deposited into the permeable zones of the aquifer, the groundwater concentrations of contaminants in those zones can be reduced gradually, thus increasing the rate of diffusion of contaminants of the less permeable zones. And eventually, all the contaminated zones will be remediated.

The said approach is preferable for in situ groundwater remediation, but there still have other methods, for example, the metal-free catalyst and reductant could be introducing to the medium through slurry injection, or by addition of the catalyst particles to a permeable reactive barrier which is placed in the medium. All in all, as long as the method can retain the catalyst particles and reductant in the contaminated medium to form an in situ reaction zone, the method can be feasible.

As is concerned to the contaminates, the present invention can remediate the waters containing haloalkenes, haloalkanes, nitro-compounds, nitrophenol and/or heavy metals using free-metal catalysts. Specially, the metal-free catalyst can catalyse the reduction reaction of tetrachloroethene (PCE) and trichloroethene (TCE) to ethyne, tetrachloromethane to trichloromethane, and the reduzates are non-toxic or less toxic to the environment. Moreover, the method can reduce the nitro-compounds and nitrophenol-compounds through hydrogenation reduction to its corresponding ammonia products which can be easier utilized in biodegradation. For example, the nitro-compounds and nitrophenol-compounds include nitrobenzene (NB), dinitrobenzene, 2-nitrophenol, chloronitrobenzene. The detoxification of heavy metals can be achieved through precipitation action because of the solubility product of metal sulfide is too small. For the high state metal like Cr(VI) and Mn(VI), reducing action would occur. Moreover, the adsorption with the contaminates including nitrobenzene, TCE and PCE of the two metal-free catalysts, especially for Bio-NC, can not be ignored.

It has been found that the size of catalyst particles utilized in the ex situ system have an impact on catalyst reactivity. On the one hand, because of the electron transfer occurs at the surface of the catalyst, making the smaller size of catalyst particles would be better for the reaction. On the other hand, when catalyst particle sizes below 0.1 um, the catalyst particles will suspend in the reactor for a long time which require centrifugation and ultrafiltration, thereby increasing the cost. So, the preferable size of catalyst particles are in the range of 1 um to about 5 um, for the ex situ system.

Under the conditions of in situ remediation, the particles size can be made smaller than ex situ condition. So that the catalyst can be injected into the permeable zones of the aquifer easier, and in somewhat, the catalyst particles in groundwater can form an in situ reaction zone easier, too. So, the preferable average size of catalyst particles is about 0.1 um to 1 um for the in situ system. In fact, the size of catalyst particles can be controlled with ball mill which is well known to those skilled in the art.

Some parameters in the system are very important, including the dosage of catalyst or reductant, the pH and temperature of the treated water. Herein, a simple summary will be described. Specifically, for the catalyst, the big dosage and the good dispensability are hoped. For the reductant, the sufficient quantity is essential. For pH, the higher, the better. For temperature, the high temperature can speed up the reaction, so some operations could be taken to increase the temperature when its possible and suitable.

In addition, it has been determined that the catalyst can be reused in the embodiment of ex situ treatment. Specifically, the catalysts were washed three times with water and dry at 80° C., and then reused for the next treatment. Specially, in the embodiment of in situ remediation, the good recyclability means the catalyst could work in a long-term. Note that, sulfide is one of the most sufficient typical reductant in underground situation. From this perspective, the sulfide could be supplied by the environment itself.

EXAMPLES

Example 1

Figure 2:
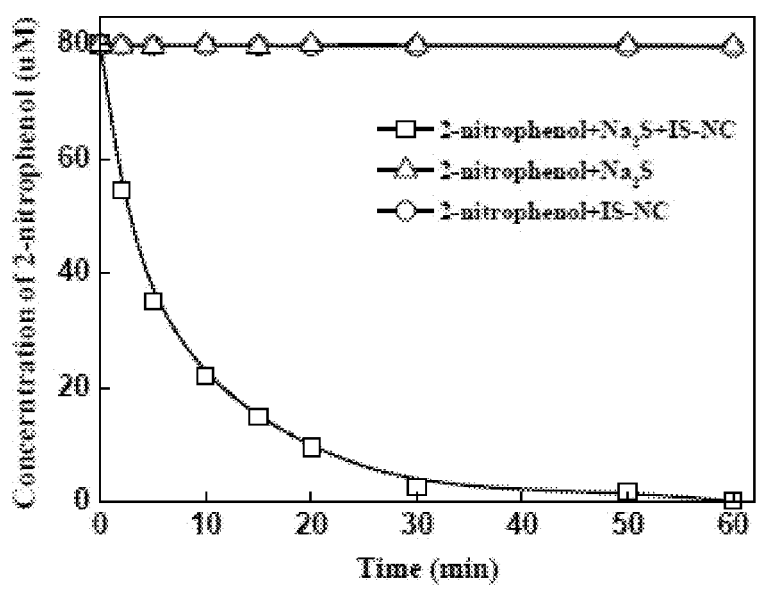
FIG. 2 is a graph proving that IS-NC can catalyze the redox reaction of nitrophenol using sulfide as a reductant.
Figure 3:
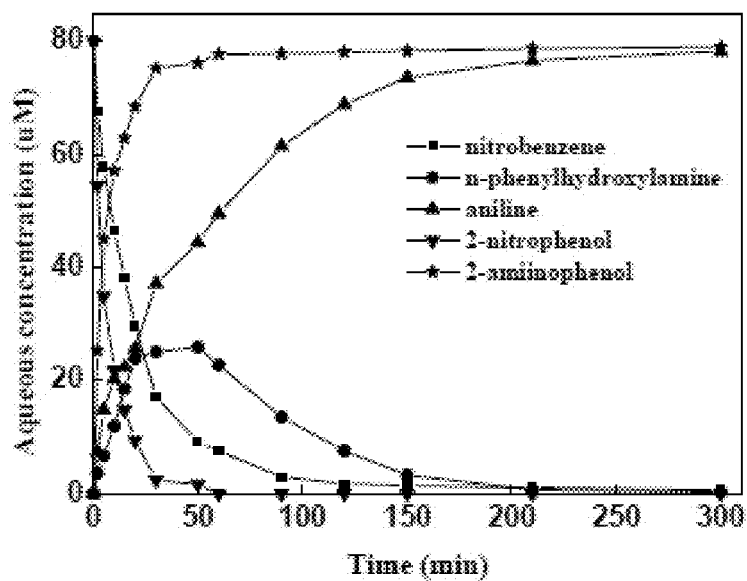
FIG. 3 is a graph of the results of remediation of nitrobenzene and nitrophenol mixed pollution in the presence of IS-NC particles in accordance with Example 1.

In this example, a method for ex situ remediation of groundwater will be tested, and the simulated contaminates were nitrobenzene, 2-nitrophenol and the mixed. Specifically, according to this example, the concentration of nitrobenzene and 2-nitrophenol are the same 80 umol/L. The metal-free material used here is IS-NC, and the dosage is 40 mg/L. 8 mmol/L sodium sulfide was chosen to be the reductant. What's more, the artificial groundwater were prepared with water containing saturated calcium carbonate. The reaction was happened in a 40 mL glass vial with a polytetrafluoroethylene (PTFE)-lined screw cap. A shaking table at 30° C. to allow the metal-freecatalyst well disperse at 150 rpm. Control experiments are operated at same condition to confirm the catalytic effects of IS-NC. The results were given in FIG. 1, FIG. 2, and FIG. 3. Obviously, it can be easy seen that only sodium sulfide in system can not remove nitrobenzene and 2-nitrophenol. Oppositely, within IS-NC in system, the nitrobenzene can be completely removed within 120 min and the complete removal of 2-nitrophenol can be acquired less than 50 min, and the detailed results were shown in FIG. 3.

Example 2

Figure 4:
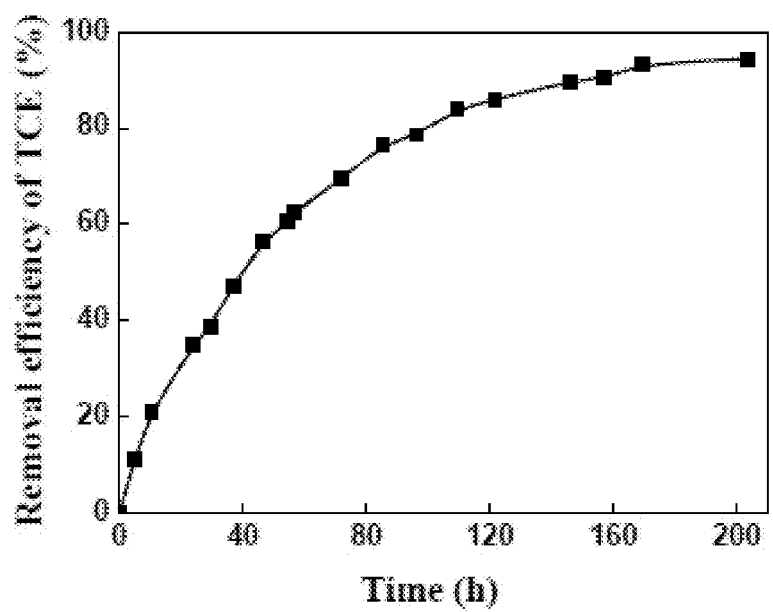
FIG. 4 is a graph of the results of remediation of TCE in the presence of Bio-NC particles in accordance with Example 2.

In this example, a method for ex situ remediation of groundwater will be tested, and the simulated contaminates were TCE. Specifically, according to this example, the concentration of TCE is 475.55 umol/L. The metal-free material used here is Bio-NC, and the dosage is 100 mg/L. 9.8 mmol/L sodium sulfide was chosen to be the reductant. The other parameters were same as Example 1, the only difference was that the reaction occurred in a 250 mL bottle with 150 mL headspace. As shown in FIG. 4, the results show more than 95% TCE was removed within 200 h.

Example 3

Figure 5:
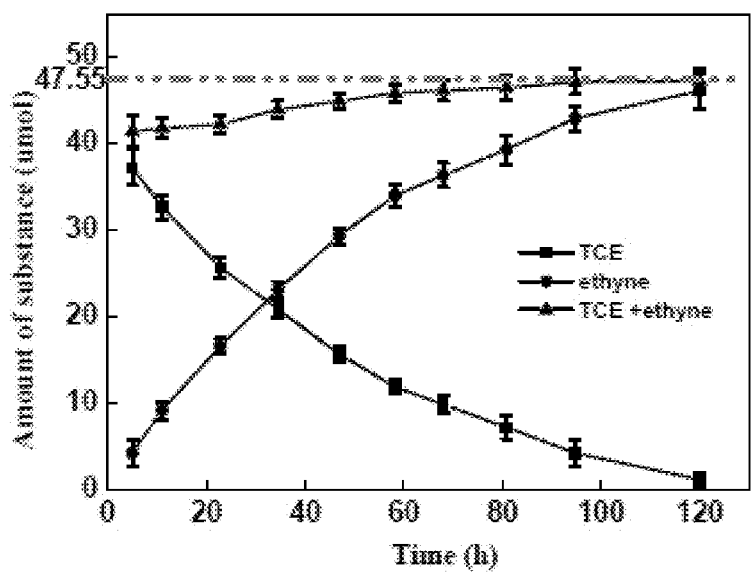
FIG. 5 is a graph of the results of remediation of TCE in the presence of IS-NC particles in accordance with Example 3.

Tests were also conducted utilizing the same parameters as Example 2, except that the metal-free catalyst is IS-NC. The results, given in FIG. 5, show that the method in this example according to the present invention can successfully convert TCE to ethyne.

Example 4

Figure 6:
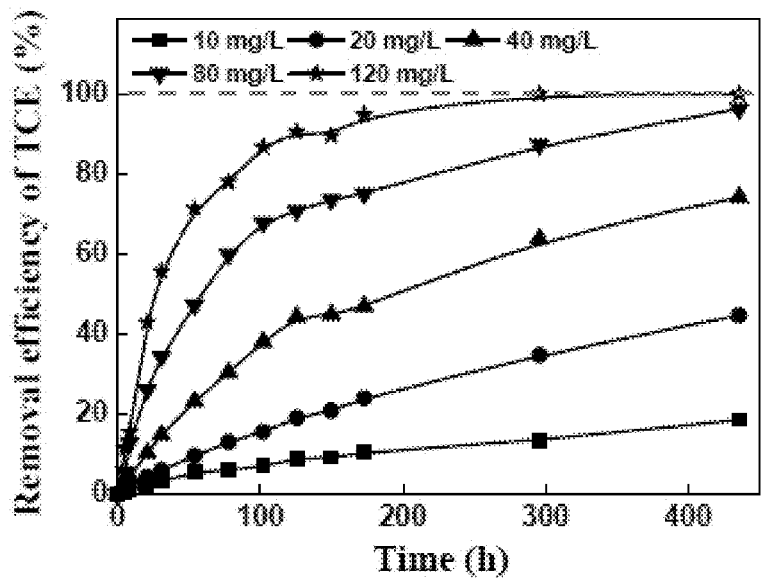
FIG. 6 shows the effect of dosage of IS-NC on catalytic ability in accordance with Example 4.

To better understand the effect of dosage of IS-NC on catalytic ability, a batch experiment was set utilizing the same parameters as Example 2, except that the dosage of IS-NC was conducted in several concentration ranging from 10 to 120 mg/L (10, 20, 40, 80, 120). The results shown in FIG. 6, in which it can be clearly determined that the more the catalyst used, the faster the removal of TCE will be.

Example 5

Figure 7:
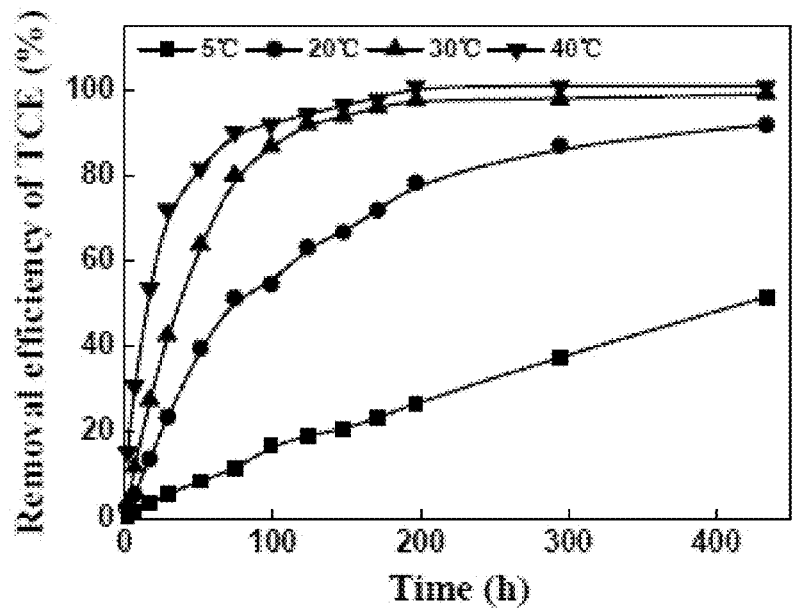
FIG. 7 shows the effect of reaction temperature on catalytic ability of IS-NC according to Example 5.

Experiments were conducted to evaluate the effects of water temperature alone. The parameters are same as Example 2, except that the water temperature was controlled in 5° C., 20° C., 30° C., 40° C. respectively. It indicated when the water temperature is high, the reaction will occur easily and quickly, based on the data shown in FIG. 7.

Example 6

Figure 8:
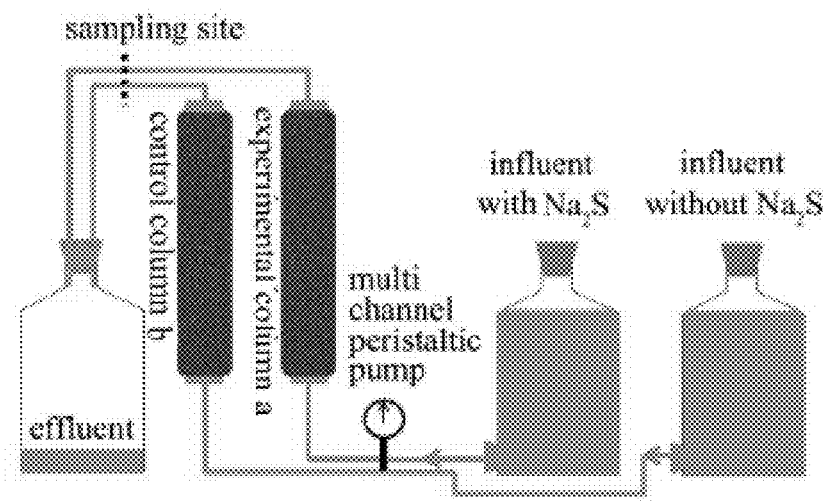
FIG. 8 is the schematic graph of the column experiment with detailed description in Example 6.

In this example, a method for in situ remediation of groundwater will be tested, and the simulated contaminate was TCE. A glass column (the length is 50 cm, the diameter is 7 cm) was employed to be the simulated device and the experimental set-up are given in FIG. 8. As shown in FIG. 8, in the two columns, ISNC particles were mixed with sand, and the weight for IS-NC and sand are 0.4 g and 800 g, respectively. However, the influents in 5 L markov bottles connecting to the column are different. In detail, one influent would pre-mixed with sodium sulfide (8 mmol/L) which is connecting to the column coded as experimental column a.

The other influent would only contain TCE (44.5 mg/L) which is connecting to the column coded as control column b. A multi-channel peristaltic pump was used to insure the same flow rate of influents. Eventually, the measured porosity is 0.364. What's more, when the flow rate was controlled at 0.18 m/d (100 uL/min), the hydraulic retention time of the column was 2.197 d (52.7 h). The ambient temperature was about 15~17° C.

During the experiments, the reactor influent and effluent concentrations of TCE for each of the reactor were sampled and tested on schedule. It is noted that, before starting the experiments, both column a and column b were reached a saturation adsorption condition. The removal rate is calculated depending on the following formula (1).

$$\text{Removal efficiency (\%)} = \frac{C(TCE)_{influent} - C(TCE)_{effluent}}{C(TCE)_{influent}} * 100\% \quad (1)$$

Figure 9:
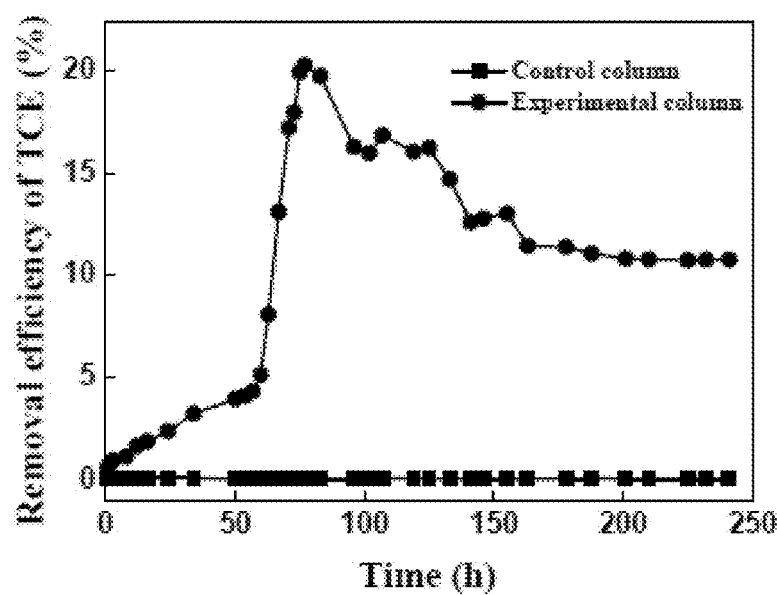
FIG. 9 is a graph of the results of a column experiment for remediation of TCE with IS-NC and sulfide in a simulated in situ environment according to Example 6.

As the results shown in FIG. 9, in the 50 hours ahead, the removal rate increased gradually to about 5%. Soon afterwards, the removal efficiency increased rapidly to the maximum about 20%, and then decreased slowly to a stable value about 11% after 180 h. It is a normal result, the rapidly increase after 50 h because of the first HRT is over, and the adsorbed TCE was reacting with sulfide too during the first HRT. The final removal efficiency of TCE would be the true value of the column system, although the value is only 11%. It is not surprising because of the ambient temperature is only 15~17° C. From the example 5 and the FIG. 7, it is clearly that ambient temperature would have a strong impact on the removal of TCE. The final removal efficiency in the column is consistent with the results in FIG. 7.

It is emphasized that the said laboratory examples are given only to describe and illustrate to the scope and the spirit of the present invention. It should be understood that such embodiments are provided by way of example only. To those skilled in the art, it should be quite evident that various modifications and substitutions could be made without departing from the scope of the present invention.

What is claimed is:

1. A method for an in situ remediation of a contaminated medium, comprising: dispersing metal-free catalyst particles into an aqueous solution with sulfide and obtaining a mixture; injecting the mixture of the metal-free catalyst particles and the aqueous solution with sulfide into permeable zones of the contaminated medium; retaining the metal-free catalyst particles in the contaminated medium when the metal-free catalyst particles go through the contaminated medium; forming an in situ reaction zone and reacting the contaminated medium continuously; and increasing the rate of diffusion of contaminants of less permeable zones;

wherein the metal-free catalyst particles are prepared by a method comprising the following steps:

a) drying a biomass in the air to obtain dehydrated biomass;

b) carbonizing the dehydrated biomass at 800° C. in a tube furnace under nitrogen flow for 6 h;

c) recovering the carbonized biomass by treating with 4 mol/L $HNO_3$ solution at 70° C. for 6 h, washing with deionized water, and drying at 110° C. to obtain a sample; and d) treating the sample at 800° C. under nitrogen flow for 6 h to produce the metal-free catalyst particles.

2. The method of claim 1, wherein the biomass comprises corn stalk, sorghum stalk, alfalfa, wormwood, soybean hull, and branches of catalpa tung.

3. The method of claim 2, wherein the biomass comprises alfalfa or wormwood.

4. The method of claim 1, wherein the aqueous solution with sulfide comprises the metal-free catalyst particles in aqueous solution with sodium sulfide, potassium sulfide, calcium sulfide, sodium sulfite or sodium hyposulfate.

5. The method of claim 1, wherein the weight ratio between the metal-free catalyst particles and the sulfide is 1-1.2:20-30.

6. The method of claim 1, wherein the average diameter of the metal-free catalyst particles ranges from 0.1 um to 1 um.

7. The method of claim 1, wherein the contaminated medium comprises one or more of haloalkenes, haloalkanes, nitro-compounds, nitrophenol, chloronitrobenzene or heavy metals.

8. The method of claim 1, further comprising: adding a cosolvent to the contaminated medium.

* * * * *